(12) United States Patent
Wijnands et al.

(10) Patent No.: US 11,240,053 B2
(45) Date of Patent: Feb. 1, 2022

(54) OVERLAY SIGNALING FOR BIT INDEXED EXPLICIT REPLICATION

(71) Applicant: Cisco Technology, Inc., San Jose, CA (US)

(72) Inventors: Ijsbrand Wijnands, Leuven (BE); Gregory J. Shepherd, Eugene, OR (US); Christian J. Martin, Rumson, NJ (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 16/654,078

(22) Filed: Oct. 16, 2019

(65) Prior Publication Data

US 2020/0052918 A1    Feb. 13, 2020

Related U.S. Application Data

(63) Continuation of application No. 14/603,561, filed on Jan. 23, 2015, now Pat. No. 10,461,946, which is a continuation-in-part of application No. 14/488,810, filed on Sep. 17, 2014, now Pat. No. 9,942,053, and a continuation-in-part of application No. 14/488,790, (Continued)

(51) Int. Cl.
*H04L 12/18* (2006.01)
*H04L 12/761* (2013.01)
*H04L 12/741* (2013.01)

(52) U.S. Cl.
CPC ......... *H04L 12/185* (2013.01); *H04L 45/16* (2013.01); *H04L 45/54* (2013.01); *H04L 45/74* (2013.01)

(58) Field of Classification Search
None
See application file for complete search history.

(56) References Cited

U.S. PATENT DOCUMENTS 6,625,773 B1    9/2003    Boivie et al.
7,263,099 B1    8/2007    Woo et al.
(Continued)

OTHER PUBLICATIONS

Chen, Ran, et al., "YANG Data Model for BIER Protocol draft-chh-bier-bier-yang-00.txt", BIER WG, Internet-Draft, Internet-Draft, Jan. 7, 2016, pp. 1-13.
(Continued)

*Primary Examiner* — Kenny S Lin
*Assistant Examiner* — Richard Schnell
(74) *Attorney, Agent, or Firm* — Campbell Stephenson LLP

(57) ABSTRACT

Various systems and methods for performing bit indexed explicit replication (BIER). For example, one method involves receiving a membership message that was generated by an egress router, where the membership message comprises information identifying a multicast group, and information identifying a plurality of egress routers. The method identifies at least one bit position in the membership message that is associated with the first egress router, where at least one bit position of the plurality of bit positions is associated with the first egress router. The method also records membership of the first egress router in the multicast group, where the membership is recorded in a bit of a group membership table, and the bit corresponds to the bit position identified in the membership message.

20 Claims, 15 Drawing Sheets

Related U.S. Application Data filed on Sep. 17, 2014, now Pat. No. 10,225,090, and a continuation-in-part of application No. 14/488,761, filed on Sep. 17, 2014, now Pat. No. 9,853,822.

(60) Provisional application No. 61/931,473, filed on Jan. 24, 2014, provisional application No. 61/878,693, filed on Sep. 17, 2013.

(56) References Cited

U.S. PATENT DOCUMENTS

| | | | |
|---|---|---|---|
| 2002/0080798 A1* | 6/2002 | Hariguchi | H04L 45/00 370/395.31 |
| 2004/0258066 A1 | 12/2004 | Chen | |
| 2005/0002371 A1 | 1/2005 | Andersen | |
| 2005/0080901 A1 | 4/2005 | Reader | |
| 2005/0100016 A1 | 5/2005 | Miller | |
| 2009/0190587 A1 | 7/2009 | Zhao | |
| 2010/0290464 A1 | 11/2010 | Assarpour | |
| 2013/0100988 A1 | 4/2013 | Miyoshi | |
| 2014/0301390 A1 | 10/2014 | Scott | |
| 2014/0376549 A1 | 12/2014 | Lu | |
| 2015/0146526 A1 | 5/2015 | Kulkarni | |
| 2016/0105397 A1 | 4/2016 | Davis, Jr. et al. | |
| 2021/0184982 A1 | 6/2021 | Zhang et al. | |

OTHER PUBLICATIONS

Kumar, N., et al., "BIER Ping and Trace," Network Working Group, Internet -Draft, Sep. 6, 2015, pp. 1-20.

Wijnands, Ijsbrand et al.; "Bit Indexed Explicit Replication Using Multiprotocol Label Switching"; U.S. Appl. No. 16/876,217, filed May 18, 2020; consisting of Specification, Claims, Abstract, and Drawings 72 pages).

Wijnands, Ijsbrand et al.; "Area-Specific Broadcasting Using Bit Indexed Explicit Replication"; U.S. Appl. No. 16/834,860, filed Mar. 30, 2020; consisting of Specification, Claims, Abstract, and Drawings (63 pages).

Wijnands, Ijsbrand et al.; "Unicast Media Replication Fabric Using Bit Indexed Explicit Replication"; U.S. Appl. No. 16/834,551, filed Mar. 30, 2020; consisting of Specification, Claims, Abstract, and Drawings (65 pages).

* cited by examiner

OVERLAY SIGNALING FOR BIT INDEXED EXPLICIT REPLICATION

RELATED APPLICATIONS

This application is a continuation of U.S. application Ser. No. 14/603,561, entitled "Overlay Signaling For Bit Indexed Explicit Replication," which was filed Jan. 23, 2015, and which is a continuation-in-part of U.S. application Ser. No. 14/488,810, a continuation-in-part of U.S. application Ser. No. 14/488,790, and a continuation-in-part of U.S. application Ser. No. 14/488,761, and which also claims the domestic benefit under Title 35 of the United States Code § 119(e) of U.S. Provisional Patent Application No. 61/931,473, with further details of U.S. application Ser. No. 14/488,810, U.S. application Ser. No. 14/488,790, U.S. application Ser. No. 14/488,761, and U.S. Provisional Patent Application No. 61/931,473 being as follows: U.S. application Ser. No. 14/488,810 is entitled "Bit Indexed Explicit Replication Using Internet Protocol Version 6," was filed on Sep. 17, 2014, and issued on Apr. 10, 2018 as U.S. Pat. No. 9,942,053, and claims the domestic benefit under Title 35 of the United States Code § 119(e) of U.S. Provisional Patent Application Nos. 61/931,473, entitled "Bit Mask Forwarding Architectures for Stateless Multipoint Replication," which was filed on Jan. 24, 2014, and 61/878,693, entitled "Multicast IPv6 with Bit Mask Forwarding," which was filed on Sep. 17, 2013. U.S. application Ser. No. 14/488,790 is entitled "Bit Indexed Explicit Replication Using Multiprotocol Label Switching," was filed on Sep. 17, 2014, and issued on Mar. 5, 2019 as U.S. Pat. No. 10,225,090, and claims the domestic benefit under Title 35 of the United States Code § 119(e) of U.S. Provisional Patent Application Nos. 61/931,473, entitled "Bit Mask Forwarding Architectures for Stateless Multipoint Replication," which was filed on Jan. 24, 2014, and 61/878,693, entitled "Multicast IPv6 with Bit Mask Forwarding," which was filed on Sep. 17, 2013. U.S. application Ser. No. 14/488,761 is entitled "Bit Indexed Explicit Replication," was filed on Sep. 17, 2014, and issued on Dec. 26, 2017 as U.S. Pat. No. 9,853,822, and claims the domestic benefit under Title 35 of the United States Code § 119(e) of U.S. Provisional Patent Application Nos. 61/931,473, entitled "Bit Mask Forwarding Architectures for Stateless Multipoint Replication," which was filed on Jan. 24, 2014, and 61/878,693, entitled "Multicast IPv6 with Bit Mask Forwarding," which was filed on Sep. 17, 2013. Each of the two provisional and four non-provisional applications referenced in this paragraph is hereby incorporated by reference in its entirety and for all purposes as if completely and fully set forth herein.

BACKGROUND OF THE INVENTION

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. In many networks, multicast is the preferred method of data forwarding. One reason for this is that multicast is a bandwidth-conserving technology that reduces traffic by simultaneously delivering data to multiple receivers. However, in traditional multicast systems, a relatively large amount of control plane information is used. Setting up and maintaining this control information has a tendency to become complex and costly in terms of computing resources, and can become a major limiting factor in overall network performance. Another issue with multicast is that due to packet delivery mechanisms used, packets are sometimes forwarded to locations where the packets were not desired. This unnecessary delivery of packets represents an unwelcome burden on network performance. Overcoming this burden by traditional means involves generation and maintenance of even more control plane information.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1:
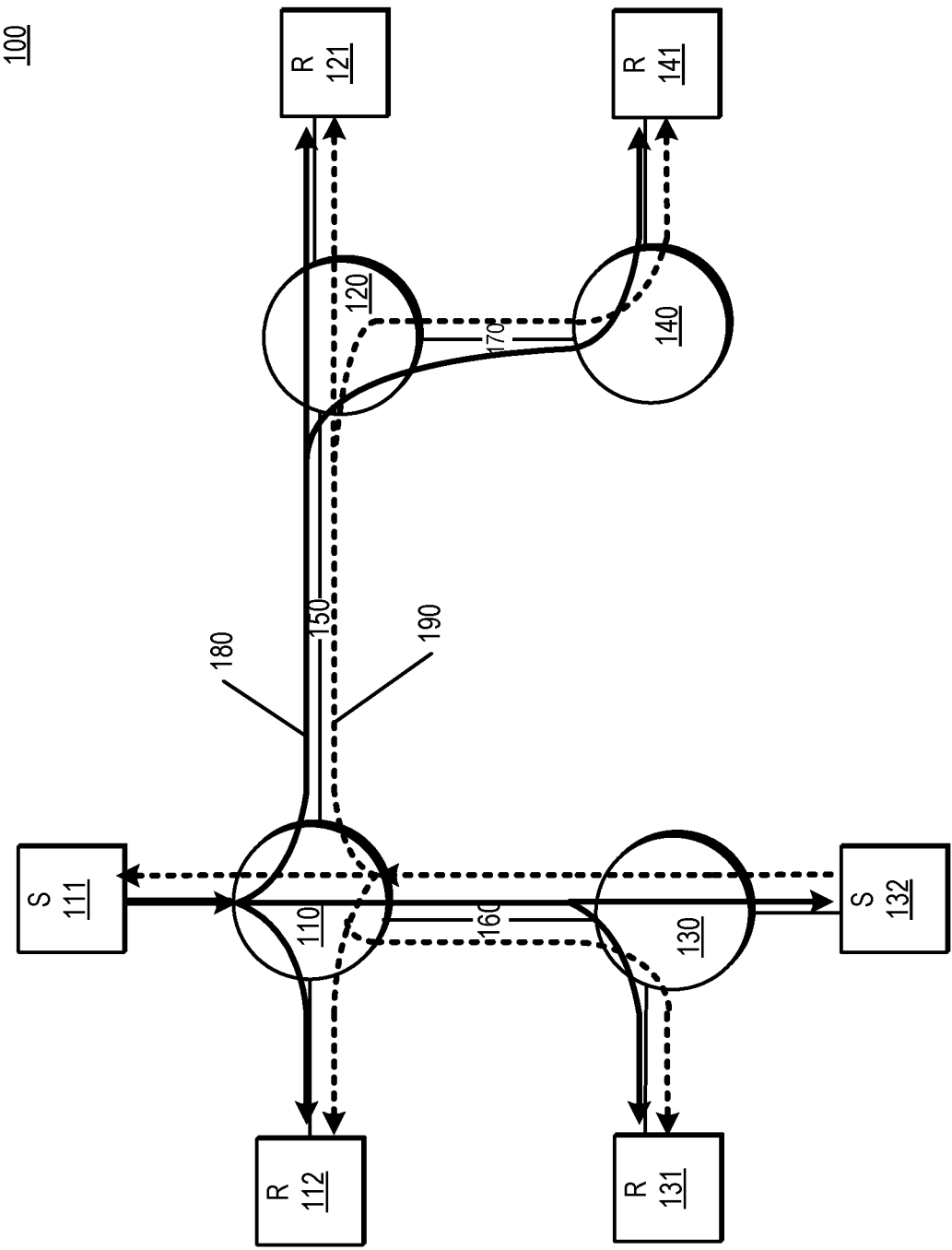
FIG. 1 is a simplified block diagram illustrating certain components of an example network.

Various systems and methods for performing bit indexed explicit replication (BIER). For example, one method involves receiving a membership request at a node. The membership request is received from a host and the membership request identifies a multicast group. In response to receiving the membership request, the node generates a membership message. The membership message includes information identifying the multicast group and information identifying the node. The node transmits the membership to an overlay participant that stores a bit string associated with the multicast group.

Multicast

Multicast delivers multicast data packets (data packets that traditionally include information identifying a multicast group, such as a multicast group address) from a source to multiple receivers without unduly burdening the source. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

A multicast-enabled node uses multicast forwarding tables maintained by the multicast-enabled node to determine which of the multicast-enabled node's interfaces (if any) a multicast data packet should be forwarded to. This involves the multicast-enabled node having knowledge of whether one or more hosts connected to the multicast-enabled node's interfaces (either directly or indirectly) have joined the multicast group with which the multicast data packet is associated. The multicast-enabled node can then replicate the multicast data packet as needed and transmit the replicated multicast data packets via the determined interface(s).

Each multicast-enabled node in a given multicast network maintains information (also referred to as state or control plane information) indicating how to forward multicast data packets so that the multicast data packets reach each receiver that has joined each multicast group. As the numbers of multicast groups, sources, and receivers grow, the amount of state information grows and storing and maintaining the state information (e.g., updating the state information in response to receivers joining and leaving multicast groups) becomes more and more of a burden on the multicast-enabled nodes and the links between the multicast-enabled nodes.

One facet of multicast is the building of multicast distribution trees (MDTs), and multicast forwarding tables used to control where in a multicast network multicast data packets are forwarded. MDTs describe the paths through the multicast network between sources and receivers. If a receiver wants to receive multicast data packets from a given source or associated with a given multicast group address, the multicast-enabled nodes build an MDT that connects the receiver to the source. Each multicast-enabled node along the MDT builds and maintains a multicast forwarding table that indicates how a multicast data packet should be forwarded to follow the MDT.

Typically, building a MDT is a receiver-driven process. That is, membership information is generated at a receiver. The membership information is propagated hop-by-hop towards a source or rendezvous point, as illustrated in the following example. When a host wants to receive multicast data packets for a given multicast group (or from a specific source), the host first sends a message indicating the host's interest in the multicast group (or source). The message can be, for example, an Internet Group Management Protocol (IGMP) membership report or a multicast listener discovery (MLD) report that contains information, such as a multicast group address, identifying the multicast group in which the host is interested. While group address is used here for the sake of brevity, it should be understood that the host can send a message with information (such as a source address) identifying a particular source from which the receiver wishes to receive multicast data packets in addition to or as an alternative to information identifying a particular multicast group. In this example, the host sends the message to a customer edge (CE) node. The CE node forwards the message to a provider edge (PE) node, which can be implemented as a multicast-enabled node in the multicast network.

In response to receiving the message, the multicast-enabled node creates and stores in memory an entry in a multicast forwarding table for the multicast group, presuming such an entry does not already exist. Multicast-enabled nodes forward multicast data packets based on the multicast forwarding table. In one example, the entry includes information indicating an interface on which the message was received from the CE node and information identifying the multicast group the host wishes to join. The multicast-enabled node determines, using the multicast forwarding table, to forward subsequently received multicast data packets for that multicast group to the interface specified in the entry.

The multicast-enabled node also determines an upstream multicast-enabled node. In one example, the multicast-enabled node performs a reverse path forwarding (RPF) check using the address (or prefix thereof) of a rendezvous point (RP) node or a source associated with the multicast group the host is joining. RPF checks are used in identifying the upstream next hop node towards the RP (or source). The multicast-enabled node then sends a join message to the upstream next hop node. The join message can be implemented using, for example, a protocol independent multicast (PIM) message. Using PIM, multicast-enabled nodes can send messages indicating that they wish to join a particular multicast group or receive multicast data packets from a particular source (a "JOIN" message). Multicast-enabled nodes can also use PIM to send a "PRUNE" message, indicating that the multicast-enabled nodes do not wish to receive packets directed to a particular multicast group or being transmitted by a particular source.

The upstream next hop node receives the join message and responds in similar fashion. More particularly, the upstream next hop node creates an entry in its multicast forwarding table, presuming one does not already exist. The entry includes information that indicates how to forward multicast data packets for a particular multicast group. For example, the entry can include information identifying an interface and a multicast group address. In response to receiving the join message, the next hop node determines an upstream next-hop node. In general this MDT building process continues with each upstream router towards the source or RP until either a join message reaches the source or RP or until the join message reaches an upstream router that has a pre-existing multicast forwarding table entry for the multicast group or source.

When a join message reaches a multicast-enabled node that already has an entry for the multicast group, the multicast-enabled node updates the multicast forwarding table, e.g., by adding information indicating that packets associated with the multicast group should be forwarded to the additional interface. Updating the multicast forwarding table completes the construction of the MDT between the source and the PE node closest to the receiver. Thereafter, multicast data packets can flow from the source to the receiver connected to the PE node via the MDT between the source and the PE node. Upon receipt by a multicast-enabled node on the MDT, multicast data packets from the source, or associated with the multicast group will be replicated as needed to provide the multicast data packets to multicast-enabled nodes on the MDT. In this manner, a multicast flow can be transmitted through a multicast network to multiple receivers. When a multicast-enabled node on the MDT receives a multicast data packet that is associated with a given group, the multicast-enabled node can access its multicast forwarding table to identify any downstream nodes on the MDT (and/or interfaces corresponding to such downstream nodes) to which the multicast data packet should be forwarded. The multicast-enabled node replicates the multicast data packet and forwards a copy of the multicast data packet toward each downstream multicast-enabled node on the MDT.

Transmitting membership information (e.g., the join request) using the same path the multicast data packets follow is known as in-band signaling. Membership information can also be signaled using out-of-band mechanisms. A join message can be sent towards a source (e.g., to a PE coupled to the source) using a border gateway protocol (BGP). This involves transmitting the membership information in a BGP message. In order to ensure that the membership information is received by the appropriate source, the BGP message includes a route target (RT) value specific to the intended source. The intended source is manually configured to import BGP messages that include the RT. Any other nodes that receive the BGP message will not import the membership information, since they have not been configured to import messages with the specific RT value. Thus, this mechanism, similar to the in-band mechanism described above, involves discovering a particular source or RP towards which membership information should be forwarded, and configuring the source or RP to receive and utilize the membership information. The creation and maintenance of additional state information in both the PE coupled to the receiver, and the PE coupled to the source involved in this out-of-band mechanism represent additional burdens on system resources and adversely affect network performance.

FIG. 1 is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and source 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110. That multicast flow is illustrated by path 180 (a solid line). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected to a multicast distribution tree (MDT) to one or more receivers for the multicast group (e.g., a host that has sent a join message, as described below). Multicast-enabled node 110 then replicates multicast data packets in the multicast flow and transmits the replicated multicast data packets from the identified interfaces to receiver 112, multicast-enabled node 120, and multicast-enabled node 130.

Source 132 is a host configured to transmit multicast data packets to a multicast group that includes as receivers hosts 111, 112, 121, 131 and 141. Source 132 transmits a multicast flow, consisting of one or more multicast data packets having a common multicast group address, to multicast-enabled node 130. That multicast flow is illustrated by path 190 (a dashed line). Multicast-enabled node 130 includes a multicast forwarding table that multicast-enabled node 130 uses to determine where to forward the multicast data packets associated with the multicast flow.

In a multiple-source multicast group, as shown in FIG. 1, any multicast-enabled node can be a source. Traditionally, in order to provide this two-way routing of multicast data packets, a bi-directional version of protocol independent multicast (PIM-BIDIR) is used to configure the multicast-enabled nodes in the multicast distribution tree. In such bi-directional multicast, multicast data packets are routed only along a shared bi-directional tree, which is rooted at a rendezvous point for the multicast group, rather than at a particular source.

Multicast-enabled nodes 120 and 130 inform node 110 that they are coupled to one or more receivers using join messages, for example, a protocol independent multicast (PIM) join message. In response to receiving the join messages, multicast-enabled node 110 updates its multicast forwarding tables to identify interfaces to which multicast data packets should be forwarded. The multicast data packets can be replicated by node 110 as needed in order to provide the multicast data packets to receivers for the multicast group (e.g., receivers 121 and 131) and other multicast-enabled nodes on the MDT (e.g., multicast-enabled node 140). In this manner, a multicast flow from source 111 can be transmitted through a multicast network to multiple receivers.

Similarly, multicast-enabled node 110 informs multicast-enabled node 130 that multicast-enabled node 110 is coupled to one or more receivers using a join message, for example, a PIM join message. In response to receiving the join message, multicast-enabled node 130 updates its multicast forwarding tables to identify the interface via which multicast-enabled node 110 is reachable as an interface to which multicast data packets should be forwarded. In this manner, a multicast flow from source 132 can be transmitted through a multicast network to multiple receivers.

As can be seen, processes traditionally used in multicast, namely, forwarding membership information and updating multicast forwarding tables for each group, result in considerable amounts of state information within the network. The multicast forwarding tables maintained by each multicast-enabled node, in particular, can become quite large. Maintaining such multicast forwarding tables represents limitations on network scalability.

Bit Indexed Explicit Replication

As described below, techniques are used to attach receiver information to packets in the form of bits and forward the packets based on the receiver information. This greatly reduces the amount of state information stored at nodes and is therefore also referred to as "stateless multicast." More formally, the term Bit Indexed Explicit Replication (BIER) is used to describe these techniques. As suggested by the term, a bit position is used as an index into a forwarding table and packets are replicated only to specified nodes. With BIER, packet forwarding and distribution of membership information both are performed without using MDTs.

Figure 2:
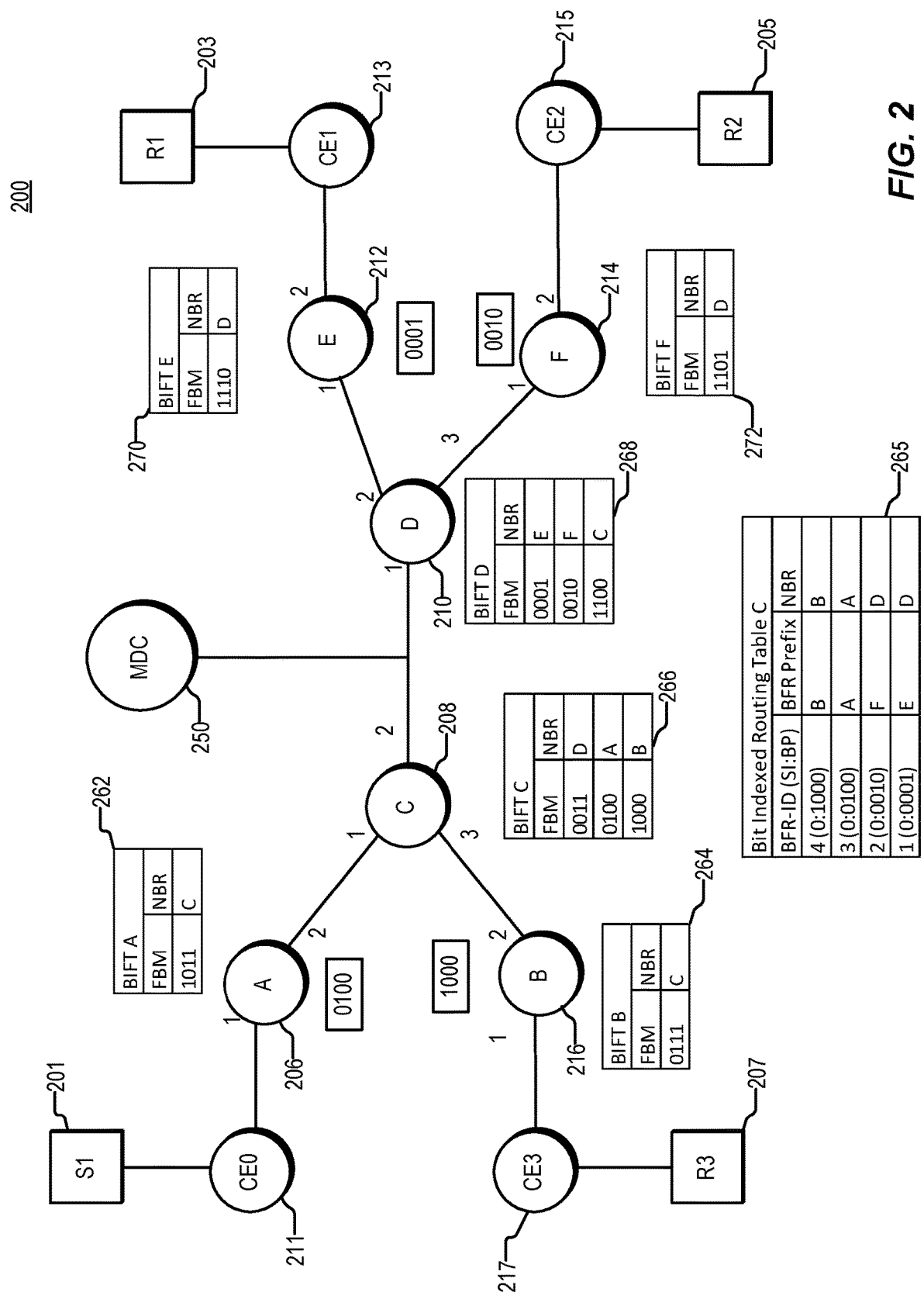
FIG. 2 is a simplified block diagram illustrating certain components of an example network.

FIG. 2 shows an example network 200. Network 200 includes BIER-enabled nodes 206-216. BIER-enabled nodes are configured to forward packets using BIER, and are sometimes referred to herein as bit forwarding routers (BFRs). BIER-enabled nodes 206-216 form a provider network, or domain. Such a provider network could be employed by an Internet service provider to transport packets to customers. The domain includes core nodes 208 and 210, also referred to as transit nodes, and provider edge nodes 206, 212, 214, and 216. The provider edge nodes are coupled to customer edge nodes 211, 213, 215, and 217. Hosts 201, 203, 205, and 207 are coupled to the customer edge nodes. Also included in the domain is a multicast domain controller 250.

Each of the BIER-enabled nodes 206-218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, a prefix, or a loopback address. Each BIER-enabled node advertises or floods the routable address to all other BIER-enabled nodes in network 200. Each BIER-enabled node builds a unicast topology of the BIER-enabled nodes in network 200 using the advertised routable addresses. In one embodiment, the router identifier can be mathematically converted to the set identifier and bit position assigned to a BIER-enabled node. The conversion depends on the length of bit string being used. For example, to convert a router identifier 'N' to a set identifier and bit position, the set identifier is the integer part of the quotient (N−1)/BitStringLength. The bit position is ((N−1) modulo BitStringLength)+1.

BIER-enabled nodes 206, 212, 214, and 216 are BIER-enabled nodes through which multicast data packets enter and/or leave the BIER domain. In one embodiment, these BIER-enabled nodes store multicast group information and encapsulate and/or de-encapsulate multicast data packet. In the example of FIG. 2, BIER-enabled node 206 is configured as a bit forwarding ingress router (BFIR) for multicast data packets. The BFIR is coupled, via customer edge node 211, to source 201. Multicast data packets from source 201 enter the BIER network via the BFIR (BIER-enabled node 206). Each of BIER-enabled nodes 212, 214, and 216 is configured as a bit forwarding egress router (BFER). The BFERs can be connected (directly or via customer edge routers) to hosts, such as receivers, or other networks. A BFER is a BIER-enabled node that is the last BIER-enabled node on a path between a source and a receiver. The BFER may be a provider edge (PE) node that is coupled to the receiver either directly or indirectly (e.g., through a non-BIER-enabled CE node).

Assigning a Bit Position in the Bit String

Each BFER in a BIER network is assigned a bit position (BP) from a set or array of bits. The array of bits can be carried in a packet or other network message. The array of bits can also be stored in forwarding and/or routing tables. For the sake of clarity, the terms used herein are "bit string" (when the array of bits is in a packet) and "bit mask" (when the array of bits is stored in a table). Also, it is noted that BFIRs can act as BFERs and vice versa. BFIRs are also assigned bit positions.

The bit string (or bit mask) can have a fixed or variable length. The length of the bit string used in the BIER network can be statically configured or dynamically assigned, and is distributed through the BIER network. In one embodiment, the length of the bit string is between 256 and 1024 bits, though shorter or longer bit strings can be used. The maximum length of the bit string value is determined, in one embodiment, by hardware or software limitations of the BIER-enabled nodes in the BIER network. In one embodiment, different BIER-enabled nodes in the BIER network use different lengths for their respective bit strings. For example, one BIER-enabled node may have a maximum bit string length of 128 bits while another BIER-enabled node may have a maximum bit string length of 256 bits. A bit string is one type of multicast forwarding entry in which each bit position of multiple bit positions is an element that can be used to represent an individual node or interface. Other types of multicast forwarding entries with other types of elements can be used.

A bit position (BP) assigned to a BFER is statically or dynamically assigned to the BFER. Each BFER should have at least one unique bit position from the bit string. In one embodiment, a central authority, such as a multicast domain controller, will assign the BPs to the BFERs. The multicast domain controller, in one embodiment, assigns multiple BPs to a single BFER, e.g., a unique BP for each of one or more interfaces included in the BFER. Other mechanisms for assigning BPs can be implemented as well, such as deriving a BP from a router identifier assigned to a BIER-enabled node, where the derivation utilizes a mapping algorithm. In some embodiments, a bit position in the bit string is assigned to a single BFER. In other embodiments, a single BP can be assigned to more than one BFER. When multiple BFERs are assigned the same BP, one of the multiple BFERs can assume ownership of the BP at a given time, and ownership can be transferred between the multiple BFERs. Ownership of the BP can be transferred to another one of the multiple BFERs for any of several reasons, such as a failover in response to a node or link failure, or if one of the multiple BFERs otherwise becomes unavailable, in response to changing network conditions, due to time-sharing considerations, and the like. Assigning one BP to multiple BFERs facilitates operation similar to anycast, in which packets are forwarded to one receiver of a group of receivers, where each receiver in the group of receivers uses a common address.

Only the BFERs in a BIER network are assigned a BP. All other BIER-enabled nodes in the network (e.g., transit nodes) don't need a BP to participate in BIER. This helps to reduce the number of bits assigned in a network. As shown in the example of FIG. 2, network 200 utilizes a four bit long bit string. Each of the four BFERs (including BFIR node 206) in network 200 is assigned a BP: node 206 is assigned BP {0100}; node 212 is assigned BP {0001}; node 214 is assigned BP {0010}; and node 216 is assigned BP {1000}.

Sets

The number of BFERs that can be addressed (assigned a BP) is limited by the size of the bit string included in the multicast data packet. The concept of sets allows an increase in the number of BFERs that can be assigned BPs. The set identifier (SI) is, for example, a number between 0 and 255. The SI allows a BP to be unique in the context of a set. For example, each BP can be re-used in each set. In an embodiment with 256 sets and a bit string length of 256 bits, 65536

(256×256) BFERs can be supported. In one embodiment, BIER-enabled nodes in the BIER network generate separate forwarding information for each SI. For example, if two different set identifiers are in use in the BIER network, the BIER-enabled nodes generate two bit forwarding tables (BFTs), one corresponding to each SI. In response to receiving a multicast data packet having a SI, the BIER-enabled node uses the SI to select which forwarding information (e.g., BFT) to use to forward the multicast data packet.

Figure 3:
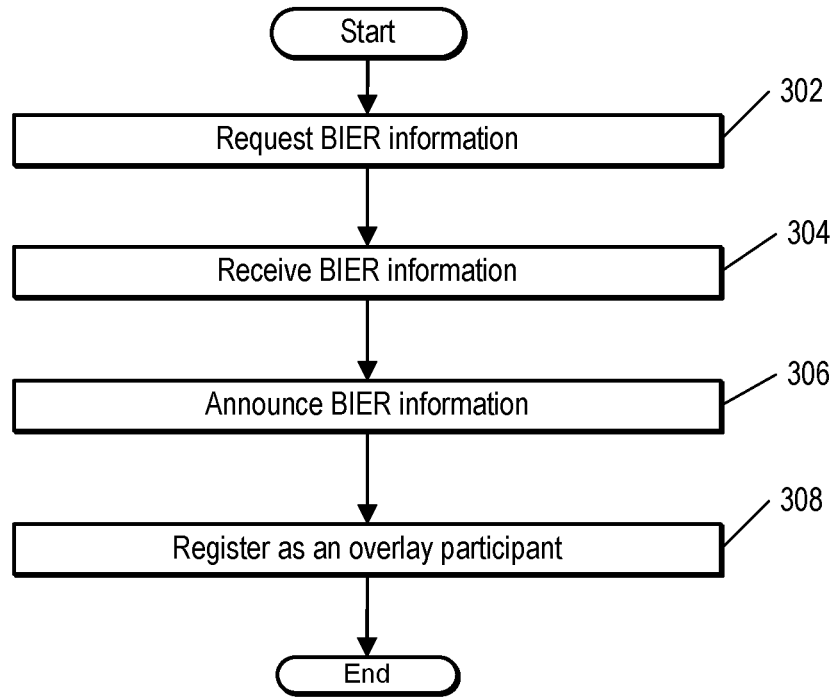
FIG. 3 is a flow chart illustrating an example process employed by a node, according to the present description.

FIG. 3 shows an example method of assigning BIER information to BIER-enabled nodes. In one embodiment, the method is performed by a BFER, such BFR 212 of FIG. 2. At 302, the BFER requests BIER information, such as a bit position and set identifier. Requesting BIER information involves, in on embodiment, the BFER sending a message to a multicast domain controller, such as multicast domain controller 250 of FIG. 2. In one embodiment, the BIER information is automatically provided to the BFER in response to detecting the BFER has joined the network, or in response to some other condition. An administrator can manually configure the BFER with a BP and set identifier.

At 304, the BFER receives the BIER information, either as a result of administrative configuration, or, for example, included in a message from the MDC in response to the request for BIER information. At 306, in response to the BFER receiving the BIER information, the BFER advertises its BIER information and its router identifier, to some or all of the other nodes in the BIER network. In one embodiment, the BFER advertises its BP via an interior gateway protocol (IGP). For example, Intermediate System to Intermediate System (ISIS) and/or Open Shortest Path First (OSPF) can be modified to assist in distributing this information through the BIER network using link state updates. Other flooding mechanisms to distribute the information are possible. All BIER-enabled nodes in a BIER network, not just the BFERs, also flood their router identifier, which is used in building network topology and unicast forwarding tables. BIER-enabled nodes, in one embodiment, advertise additional information as well, such as a bit string size that the BIER-enabled node is configured to use. Adding such BIER information to the advertised information is a relatively small amount of additional information, as compared with the state information maintained on a per-group basis in traditional multicast.

At 308, the BFER registers as an overlay participant. As described below, registering as an overlay participant enables a BIER-enabled node to forward multicast membership information to other overlay participants and to receive multicast membership information from other overlay participants. In one embodiment, registering as an overlay participant involves sending a message to the MDC and/or to one or more other overlay participants in the BEIR network.

Figure 4:
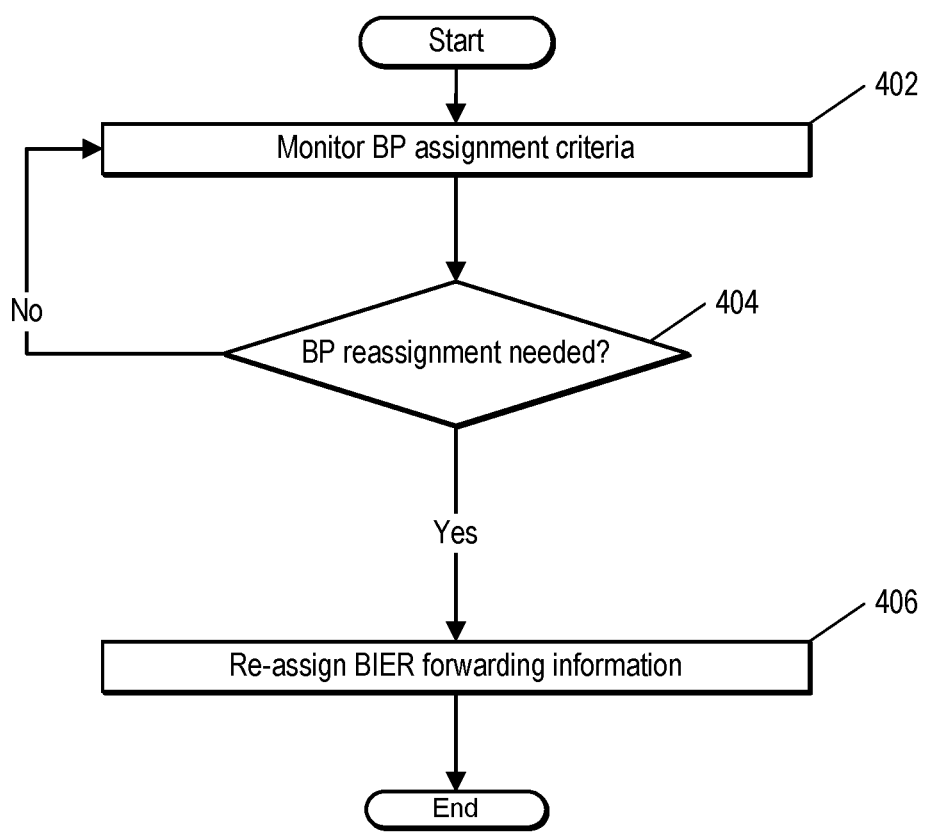
FIG. 4 is a flow chart illustrating an example process employed by a node, according to the present description.

FIG. 4 shows an example method of dynamic BP assignment. In one embodiment, the method is performed by a multicast domain controller, such as multicast domain controller (MDC) 250 of FIG. 2. At 402, the MDC monitors one or more bit position assignment criteria. For example, the bit position assignment criteria can include time, utilization of one or more network resources, geographic location, or the like.

At 404, the MDC determines whether a bit position reassignment is needed, as indicated by the bit position assignment criteria. If so, the MDC reassigns BIER forwarding information, including a bit position and/or set identifier, to one or more BFERs, at 406.

BM Routing and Forwarding Tables

Each BIER-enabled node in the BIER network uses the advertised BPs and router identifiers of the other BIER-enabled nodes to generate one or more bit indexed routing tables (BIRTs) and bit indexed forwarding tables (BIFTs). The BIER-enabled nodes use these tables to forward multicast data packets. A bit indexed routing table, as shown by example BIRT 265 of FIG. 2, is a table that stores BP-to-router identifier mappings, e.g., as learned via the IGP. Each BIER-enabled node receives BP-to-router identifier mappings and stores them in a BRT. Using the router identifiers, a BIER-enabled node performs a recursive lookup in unicast routing tables to identify a directly connected next hop BIER-enabled node (referred to herein as a neighbor (NBR)) on the shortest path from the BIER-enabled node toward the BIER-enabled node associated with the BP. In one embodiment, the NBR is the next hop on a shortest path (SPT) towards the BFER that advertised the BP. In one embodiment, the BRT includes one entry per BP.

Each BIER-enabled node translates its BRT(s) into one or more bit indexed forwarding tables (BIFTs). FIG. 2 illustrates the BIFTs for each BIER-enabled node in network 200. BIFT A 262 is generated by BIER-enabled node A 206. BIFT B 264 is generated by BIER-enabled node B 216. BIFT C 266 is generated by BIER-enabled node C 208. BIFT D 268 is generated by BIER-enabled node D 210. BIFT E 270 is generated by BIER-enabled node E 212. BIFT F 272 is generated by BIER-enabled node F 214.

Generating a BIFT involves, in one embodiment, first sorting the BIRT by neighbor. For entries in the BIRT that have a common NBR, the BPs of those entries are OR'd together, creating a bit mask that is a combination of the BPs from those entries. This is referred to herein as a forwarding bit mask (FBM) or just bit mask (BM). Multicast data packets are forwarded by the BIER-enabled nodes using the BIFTs. For example, according to BIFT C 266, if a multicast data packet having a BP with either or both of {0001} or {0010} set arrives at node 208, the multicast data packet should be forwarded to NBR D (BIER-enabled node 210 in the example of FIG. 2). If a multicast data packet arrives at node 208 having a BP of {0100} set, the multicast data packet should be forwarded to NBR A (BIER-enabled node 206 in the example of FIG. 2). If a multicast data packet arrives at node 208 having a bit string of {0101}, the multicast data packet should be forwarded to both NBR A and NBR D.

BIER Overlay

As noted above, multicast data packets are forwarded to receivers who want to receive the multicast data packets, for example, receivers who have joined a particular multicast group. Ideally, multicast data packets are not forwarded to receivers who have not joined a multicast group. Determining which receivers have joined a multicast group, and thus should receive multicast data packets for the multicast group, involves using membership information. In networks that employ BIER, the membership information is distributed using one or more out-of-band mechanisms. In one embodiment, the membership information is transmitted using an exterior gateway protocol, such as Border Gateway Protocol (BGP). Typically, BGP is used to distribute reachability information between autonomous systems. BGP messages are forwarded between edge routers. With BIER, unlike traditional multicast, group membership information is stored at edge routers, and is not stored at transit nodes. BGP is one mechanism used to distribute membership information to BIER edge routers.

Figure 5:
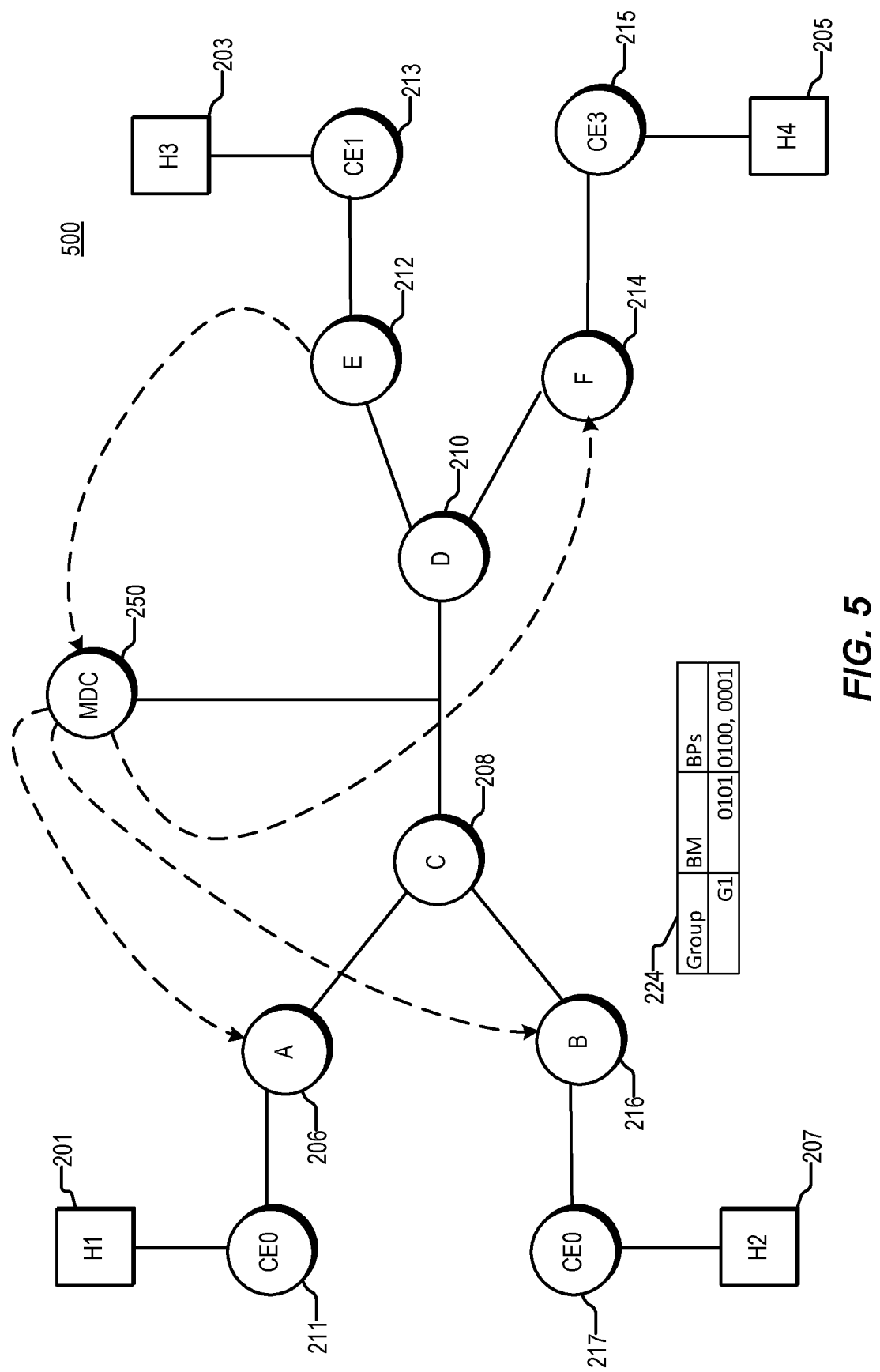
FIG. 5 is a simplified block diagram illustrating certain components of an example network.

FIG. 5 is a simplified block diagram illustrating certain components of an example network 500. Network 500 is similar to the network shown in FIG. 2, and like elements have like reference numbers. FIG. 5 illustrates, using dashed lines, overlay signaling. BIER-enabled node 212 sends membership information to a multicast domain controller 250. Multicast domain controller 250 transmits membership messages that include the membership information to the other BIER-enabled edge nodes in network 200. The membership information includes information identifying a multicast group, such as a multicast group address, as well as information identifying the bit position of the BFER that transmitted the membership message. The membership information also includes information identifying whether the BFER wishes to subscribe to or unsubscribe from the multicast group. In one embodiment, the MDC aggregates membership information from multiple BFERs and the membership messages include a bit mask having multiple bits set, each set bit corresponding to one of the BFERs.

While FIG. 5 shows the membership information being sent to MDC 250, which collects and distributes the membership information to the rest of the edge routers in the network, MDC 250 is, in some embodiments, omitted. When no MDC is included, the BFERs transmit membership information to each other.

Figure 6:
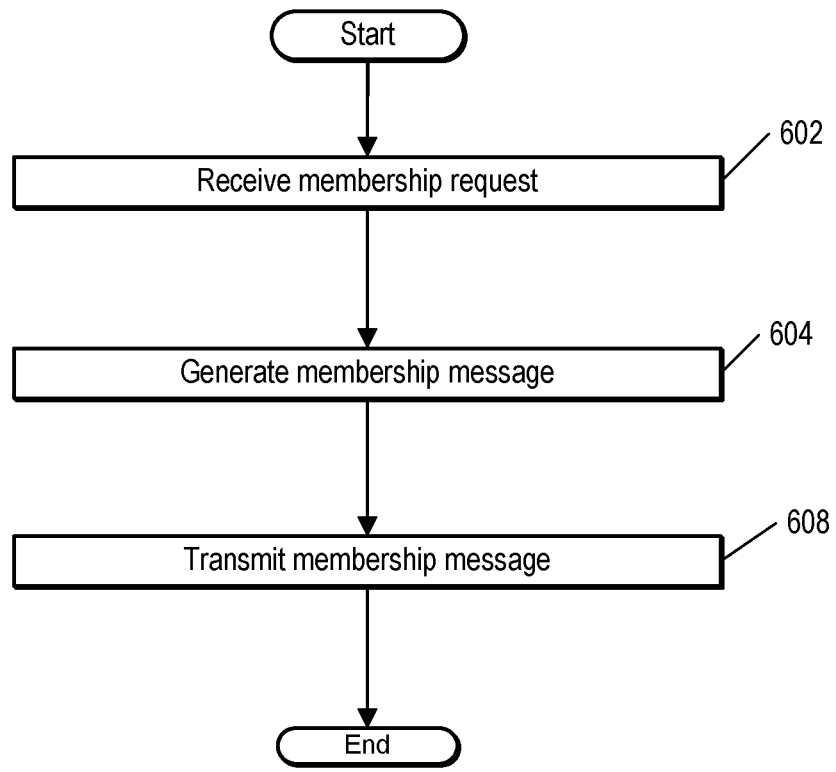
FIG. 6 is a flow chart illustrating an example process employed by a node, according to the present description.

FIG. 6 shows an example method of utilizing overlay signaling to distribute membership information in a BIER network. In one embodiment, the method of FIG. 6 is performed by a BFER, such as BIER-enabled node 212 of FIG. 5.

At 602, the BFER receives a membership request from a host, such as host 203 of FIG. 5. The membership request is optionally relayed through a customer edge node, such as customer edge node 213 of FIG. 5. In one embodiment, the membership request comprises an IGMP message. The membership request includes information identifying a multicast group, and information identifying whether the host wishes to join, e.g. subscribe, or leave, e.g. unsubscribe from, the multicast group. In response to receiving the membership request, the BFER updates forwarding information indicating the host's membership in the multicast group. For example, if the membership request indicates that the host wishes to join multicast group G1, the BFER updates a forwarding entry such that any multicast data packets received by the BFER and addressed to multicast group G1 will be forwarded to the host by the BFER.

At 604, the BFER generates a membership message. The membership message signals the BFER's interest in the multicast group. In one embodiment, the membership message is implemented using BGP. The membership message carries information identifying the multicast group, and information identifying the BFER, such as the set identifier and bit position of the BFER. In one embodiment, the membership message includes the router identifier, rather than the set identifier and bit position.

At 608, the BFER transmits the membership message. In one embodiment, transmitting the membership message involves forwarding the membership message to a multicast domain controller, such as MDC 250 of FIG. 5. The MDC then transmits the membership message to one or more edge routers that have registered as overlay participants. In one embodiment, registering as an overlay participant involves sending a request for a bit position to the MDC. In another embodiment, registering involves opening a TCP session with one or more other edge routers.

In one embodiment, transmitting a membership message does not involve transmission of the message to a multicast domain controller. Instead, the BFER transmits the membership message to one or more other overlay participants in the network. By default, the membership message is transmitted to all other overlay participants. However, in one embodiment, the BFER specifies that one or more of the overlay participants should not receive the membership message. This can be accomplished by, for example, using a route target (RT). Using RTs, the overlay participants can be configured, e.g. by an administrator, such that only certain overlay participants will receive and import the membership message. This is known as filtering. The BFER includes a RT in the membership message, and only a BFER that is configured to import messages with the RT will do so. BFERs not configured to import messages corresponding to the RT drop or ignore the membership message. In one embodiment, membership messages are used to implement source specific multicast. This involves sending, e.g., by including a source address in the membership message, the membership message to only a particular edge router, for example, an edge router coupled to a particular source or multicast group. BFERs other than the BFER corresponding to the source address in the membership message do not receive the membership message, or drop it.

Figure 7:
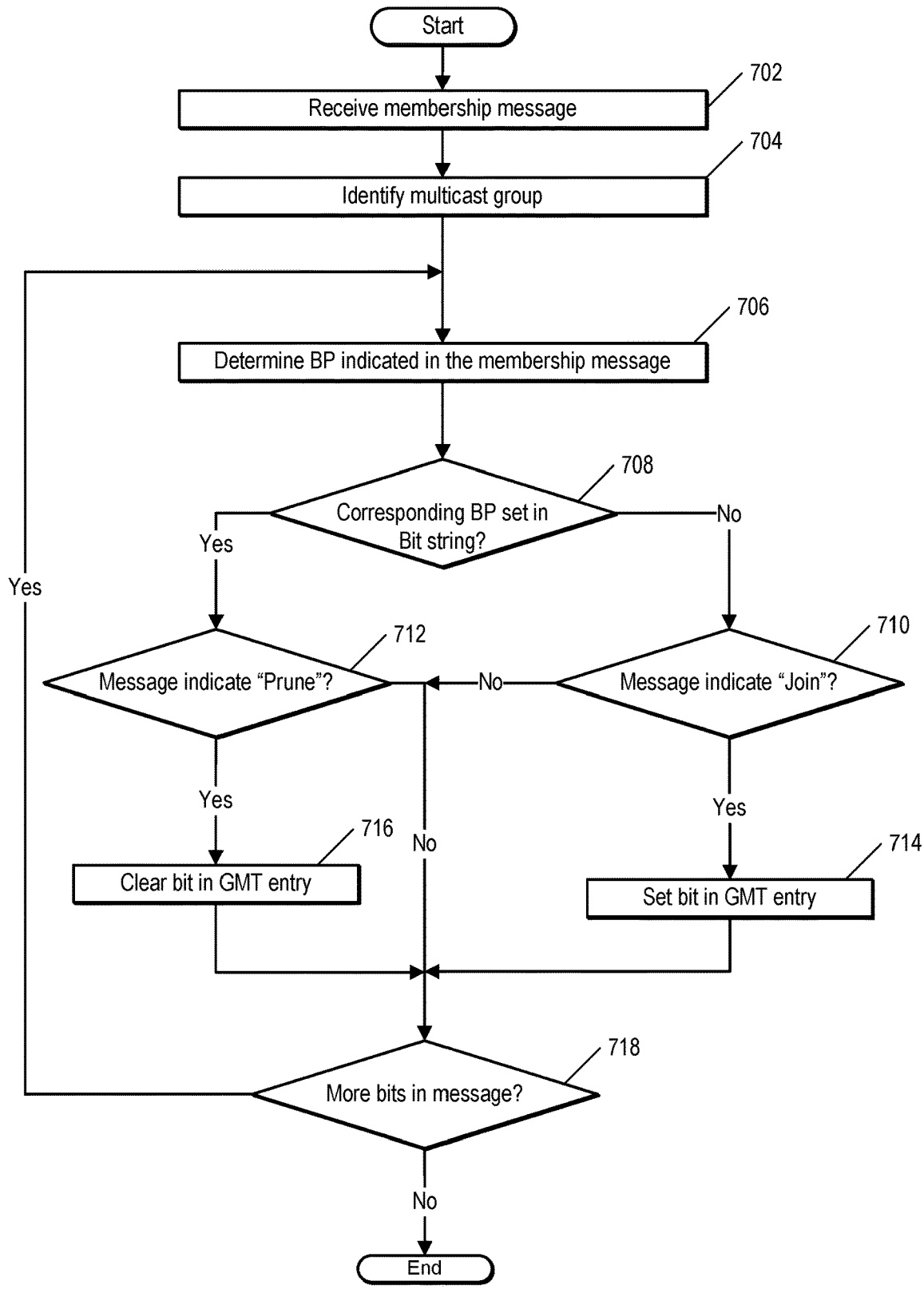
FIG. 7 is a flow chart illustrating an example process employed by a node, according to the present description.

FIG. 7 shows a method performed by an overlay participant, such as BFER 206 of FIG. 5. The method can be performed by an overlay participant regardless of whether or not the overlay participant is connected to a source for a particular multicast group.

At 702, the overlay participant receives a membership message. In one embodiment, the membership message is a BGP message. At 704, the overlay participant identifies a multicast group identified by the membership message. In one embodiment, this involves parsing the membership message, identifying a multicast group address field, and extracting the multicast group address. The overlay participant determines whether group membership information for the multicast group is stored by the overlay participant. For example, the overlay participant maintains a group membership table (GMT) with an entry for each of a number of multicast groups. An example GMT 224 is shown in FIG. 5. The group membership table includes a group identifier, which may be a multicast group address or label corresponding to a given multicast group. The GMT also includes a bit string corresponding to the multicast group. Each bit set in the bit string corresponds to a BFER that has expressed an interest, or subscribed, to the multicast group. The group membership table also includes a list of bit positions for those BFERs. In the example of GMT 224, two BFERS have joined group G1. The BPs assigned to those two BFERs are {0100} and {0001}, respectively. If the overlay participant does not already have a group membership table entry corresponding to the multicast group identified in the membership message, the overlay participant creates a group membership table entry for the multicast group.

At 706, the overlay participant determines one or more bit positions associated with the BFER that generated the membership message. In one embodiment, this involves translating a value, such as a router ID or other integer representation for a bit position, into a bit position and set identifier, or performing a lookup in the overlay participant's BIRT using the router ID. In one embodiment, determining the BP(s) involves accessing a bit string included in membership message. The bit string can include one or more set bits indicating, for each set bit, a BFER that wishes to subscribe to the multicast group. In the case where the membership message is an unsubscribed message, the set bits indicate BFERs that wish to unsubscribe from the multicast group identified in the membership message.

At 708, the overlay participant accesses the bit string in the GMT that corresponds to the multicast group identified by the membership message. The overlay participant determines whether a bit position in the bit string that corresponds to a BP identified in the membership message contains a set bit (e.g., a 1). If the bit is set, the overlay participant determines, at 712, whether the membership message indicates a prune, or unsubscribe. If so, at 716, the overlay participant clears the bit in the group membership entry. If the bit position in the bit string does not include a set bit, the overlay participant determines, at 710, whether the message indicates a join, or subscribe. If so, the overlay participant sets the bit in a group membership table entry, at 714. At 718, the overlay participant determines whether more bits are included in the membership message. If so, the method returns to 706 and the next set bit is located.

Multi-Sender

As noted above, each of several overlay participants (e.g., BFERs) receives membership messages and maintains GMTs, regardless of whether the overlay participant is connected to a source. If an overlay participant not previously connected to a source becomes connected to a source, the presence at the overlay participant of the GMT means that the overlay participant can immediately begin forwarding multicast data packets from the source. No additional state or multicast distribution trees need to be generated. Each overlay participant can become a BFIR, and multiple BFIRs can concurrently forward multicast data packets into the BIER network.

Forwarding

Figure 8:
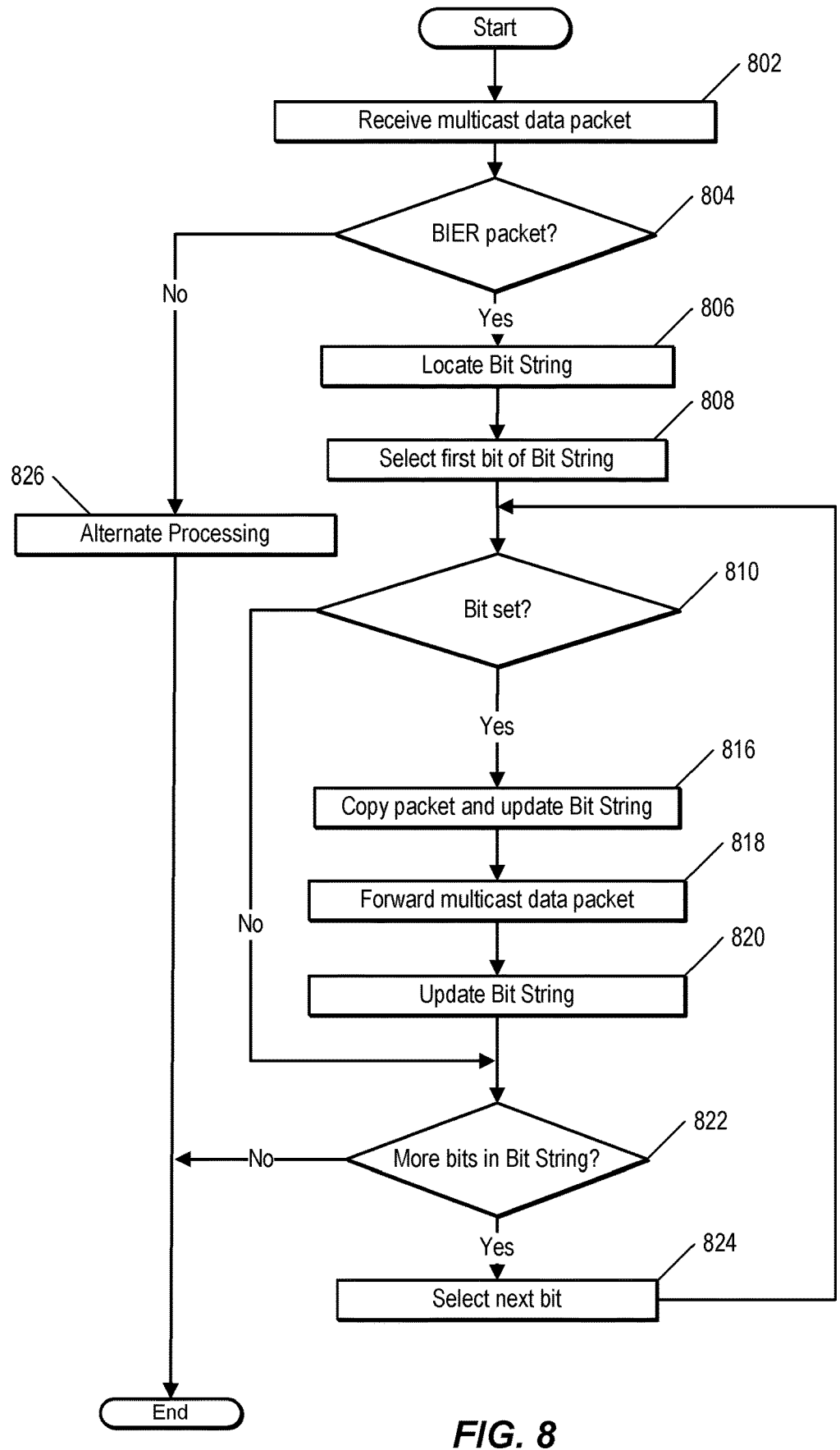
FIG. 8 is a flow chart illustrating an example process employed by a node, according to the present description.

FIG. 8 is a flow chart illustrating an example method of forwarding a packet using BIER. The method can be performed by a BIER-enabled node, such as one of BIER-enabled nodes of FIG. 5. At 802, the BIER-enabled node receives a multicast data packet. The BIER-enabled node determines, at 804, whether the multicast data packet is a BIER multicast data packet, and therefore includes a bit string. In one embodiment, the BIER-enabled node scans the header of the multicast data packet for a value that indicates that the multicast data packet is a BIER packet. The BIER-enabled node can detect that the sender of the multicast data packet was a BIER-enabled node and therefore conclude that the multicast data packet is a BIER multicast data packet. If the multicast data packet is not a BIER multicast data packet, the BIER-enabled node performs alternate processing at 826. In one embodiment, alternate processing 826 involves flooding the multicast data packet to all interfaces on the BIER-enabled node, or dropping the multicast data packet. Alternatively, if traditional multicast forwarding information is available, the BIER-enabled node can use that information to forward the packet.

If the multicast data packet is a BIER multicast data packet, the BIER-enabled node knows that the multicast data packet includes a bit string. The BIER-enabled node locates the bit string in the multicast data packet at 806. Using the bit string, the BIER-enabled node determines which neighbors the multicast data packet should be forwarded to. In one embodiment, this involves determining, as shown at 808, whether the first bit of the bit string is set, as shown in 810. If the bit is not set, the BIER-enabled node determines, at 822, whether more bits are present in the bit string. If so, the BIER-enabled node selects the next bit at 824 and the method return to 810.

At 810, the BIER-enabled node determines whether the bit is set. In response to determining that a bit in the bit string is set, the BIER-enabled node forwards a copy of the packet to the interface via which a host corresponding to the set bit is reachable. This involves, at 816 creating a copy of the packet and updating the bit string. Updating the bit string in the copy of the packet involves clearing bits in the bit string that correspond to neighbors that are not reachable via a shortest path from the interface to which the copy of the packet is being forwarded. This can be accomplished by performing an AND operation between the bit string from the incoming multicast data packet and the bit mask in the forwarding table entry that corresponds to the selected bit. The resulting value is used as the bit string for the copy of the multicast data packet. At 818, the BIER-enabled node forwards the multicast packet to the interface.

At 820, the BIER-enabled node updates the bit string that arrived in the multicast data packet by clearing those bits in the multicast data packet's bit string that correspond to the bits which were set in the multicast data packet that the BIER-enabled node forwarded. In one embodiment, this involves performing an AND operation between the bit string in the received multicast data packet, and the inverse of the bit mask in the entry corresponding to the selected bit. This has the effect of clearing those bits that correspond to bit positions which were set in the bit string of the outgoing packet, which prevents looping and duplication. The BIER-enabled node then determines, at 822, whether more bits are present in the bit string. The BIER-enabled node then continues to walk to the bit string of the received multicast data packet, bit-by-bit, until the end of the bit mask is reached.

Multiple Areas

As described above, the number of BIER-enabled nodes that can be assigned bit positions in a bit string is limited by the length of the bit string. Using sets is one way to increase the number of BIER-enabled nodes that can be uniquely identified. Another technique that increases the number of BIER-enabled nodes that can be uniquely identified is to divide a BIER network into multiple areas. Each area runs its own IGP. Bit positions are unique within a given area and are flooded only to those BFRs within the area. Thus, if the length of the bit string used in the BIER network is 256, dividing the BIER network into three areas allows assignment of bit position to 768 BIER-enabled nodes, rather than just 256. Membership information is transferred between the areas by area boundary routers (ABRs) using overlay signaling, e.g., BGP messages.

Figure 9:
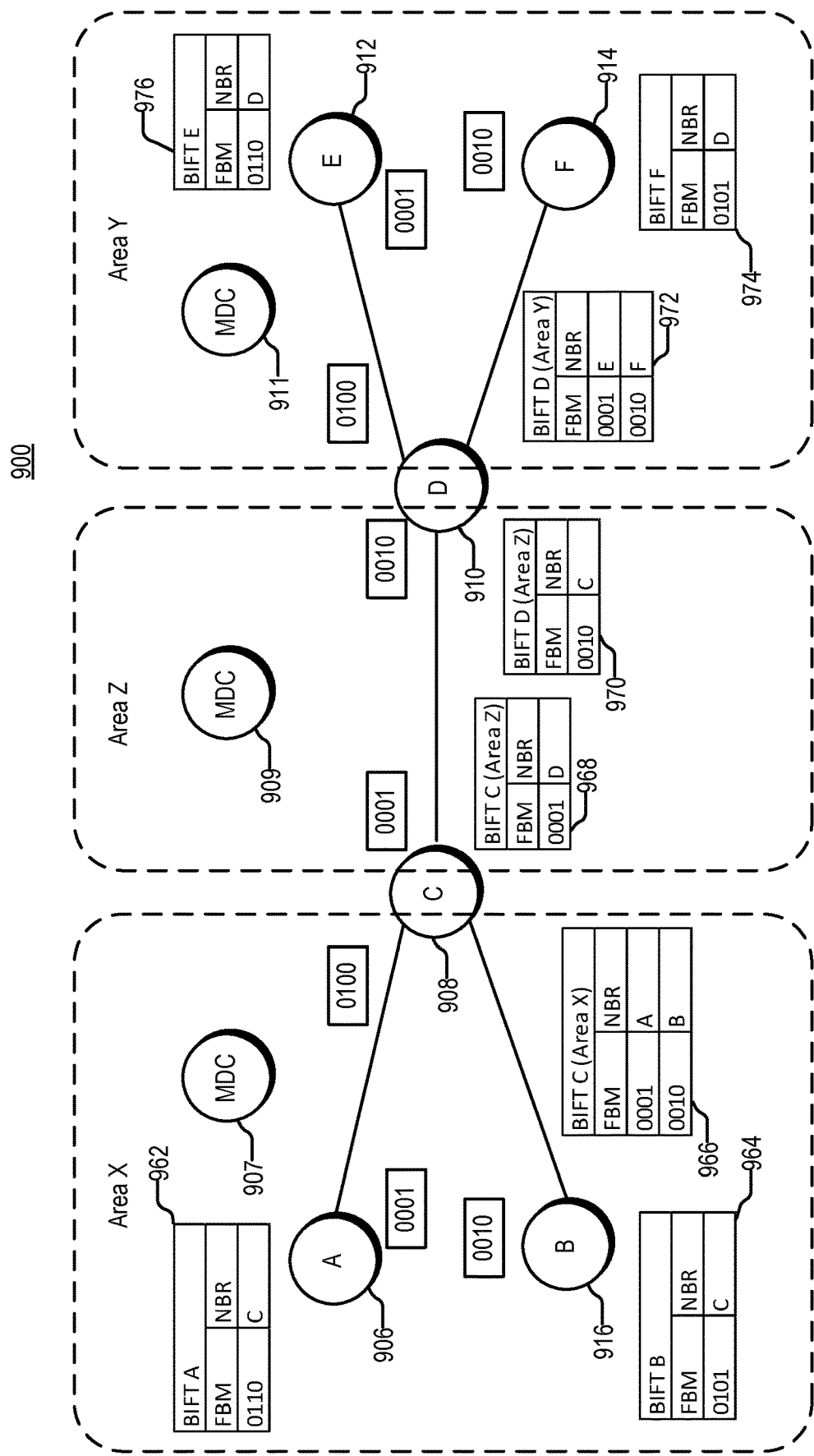
FIG. 9 is a simplified block diagram illustrating certain components of an example network.

FIG. 9 is an example of a network diagram where BIER network 900 is divided into three areas. Area X includes BIER-enabled routers 906 and 916. Area X also includes multicast domain controller 907. Area Z includes multicast domain controller 909, and area Y includes BIER-enabled nodes 912 and 914, as well as multicast domain controller 911. Also shown in FIG. 9 are area boundary routers, 908 and 910. The edge routers (906, 916, 912, and 914) can be coupled to one or more hosts (not shown) via one or more customer edge nodes (not shown).

Each BIER-enabled edge router receives a bit position that is unique within each area: node 906 is assigned {0001}; node 916 is assigned {0010}; node 912 is assigned {0100}; node 914 is assigned {0010}. As can be seen, bit positions are reused in different areas. In one embodiment, the BPs are assigned in response to the BIER-enabled edge routers registering with the MDC in its area. In response to being assigned a BP, a BIER-enabled node floods an announcement including that bit position to all other BIER-enabled nodes in its area using a BIER underlay, such as an IGP.

ABRs 908 and 910 are included in two areas each, and therefore register with two MDCs each and are assigned a BP for each area in which they reside. ABR 908 is assigned {0100} for Area X and {0001} for Area Z. ABR 910 is assigned {0010} for Area Z and {0100} for Area Y. Area boundary routers receive packets and other network messages, such as membership messages, from BIER-enabled nodes one area and forward the packets and/or network messages to BIER-enabled nodes in one or more different areas, in addition to forwarding packets and/or network messages within an area.

Figure 10:
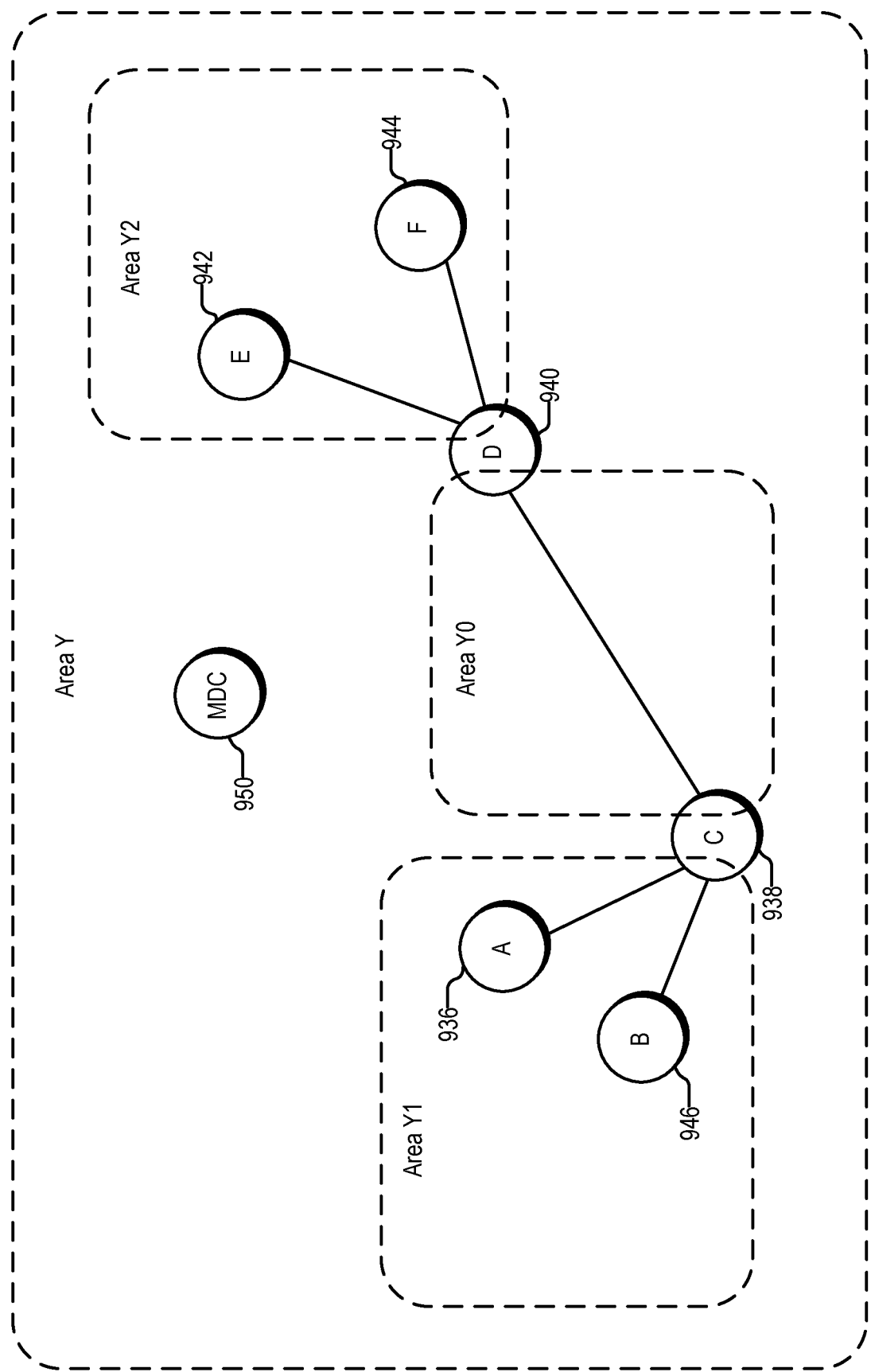
FIG. 10 is a simplified block diagram illustrating certain components of an example network.

FIG. 10 shows an example network where an area, as described with regard to FIG. 9, is divided into sub-areas. Each sub-area includes one or more BIER-enabled nodes, and is joined to one or more other sub-areas using an area boundary router. The bit position assigned to each BIER-enabled node is unique in the context of area Y. Area Y1 includes BIER-enabled nodes 936 and 946. Area Y2 includes BIER-enabled nodes 942 and 944. Area Y0 joins area Y1 and area Y2 and includes area boundary routers 938 and 940. Area Y also includes a multicast domain controller 950.

Figure 11:
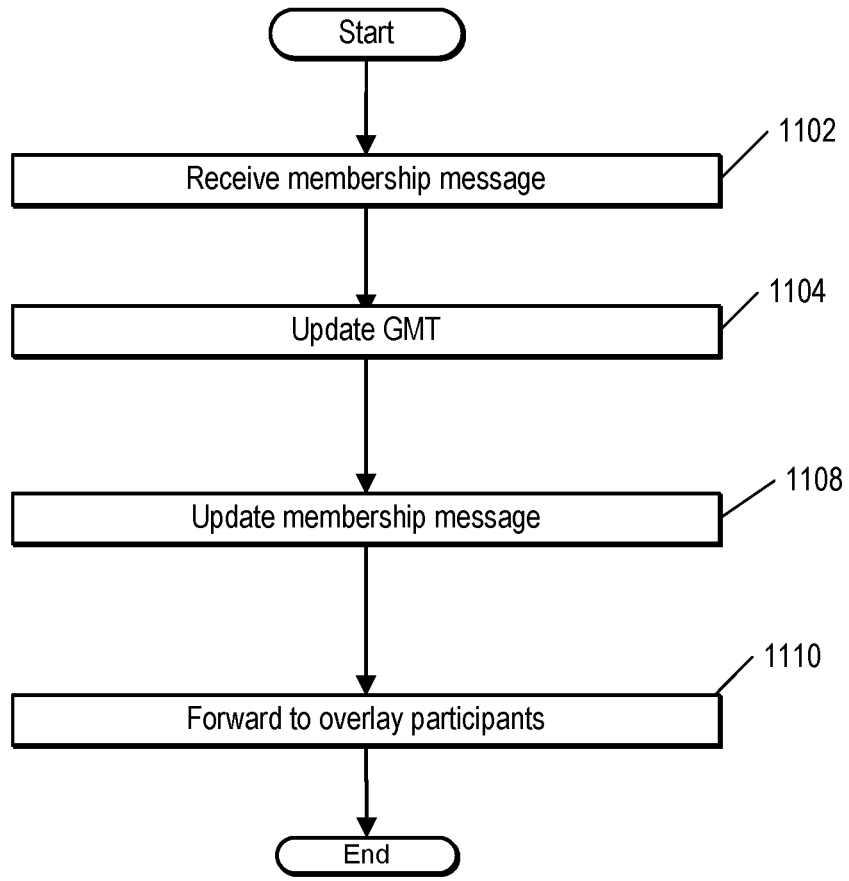
FIG. 11 is a flow chart illustrating an example process employed by a node, according to the present description.

FIG. 11 shows an example method performed by an area boundary router, such as ABR 910 of FIG. 9. At 1102, the ABR receives a membership message. In one embodiment, the membership message is a BGP message received from a BFER in the same area in which the ABR is included. For example, BIER-enabled node 912 can send a membership message using BGP to the ABR. The membership information includes information identifying BIER-enabled node 912's BP, which is shown as {0001} and a group that BIER-enabled node 912 wishes to join or leave. In one embodiment, the membership includes information identifying the BIER-enabled node, such as a router ID or other address information that the ABR uses to lookup the BP associated with the BIER-enabled node, e.g., in the ABR's BIRT.

At 1104, the ABR updates a group membership table. In one embodiment, the ABR maintains one or more group membership tables for a number of multicast groups. Updating the GMT involves, in one embodiment, adding information indicating that the BFER from which the membership message was received is subscribed to the multicast group. For example, the ABR sets a bit corresponding to the BFER in a bit string stored in a GMT entry corresponding to the multicast group. In the example of an unsubscribe, or prune, updating the GMT involves clearing a bit corresponding to the BFER's bit position in the bit string. In one embodiment, the ABR does not store the bit string in a GMT. Instead, the ABR transmits the entire bit string to one or more overlay participants, as well as information identifying the area the bit string corresponds to. In this embodiment, a BFIR replicates and transmits a multicast data packet for each area from which the BFIR has received a bit string. Instead of the multicast data packet being replicated during forwarding through the BIER network, the multicast data packet is replicated at the BFIR and is only forwarded using the bit string once the multicast data packet arrives at the corresponding area.

At 1108, the ABR updates the membership message. In one embodiment, this involves setting a bit corresponding to the bit position assigned to the ABR by the area into which the membership message is being forwarded. For example, in response to receiving a membership message from BIER-enabled node 912, ABR 910 removes BIER-enabled node 912's BP and inserts its own BP, which is {0010} in Area Z, into the membership message. The membership message still contains information identifying the multicast group. ABR 910 is effectively joining the multicast group on behalf of Area Y, and specifically BIER-enabled node 912 in Area Y.

At 1110, the ABR forwards the membership message to overlay participants included in the area. In one embodiment, one or more BFERs are included in the area, and the ABR forwards the membership message to those BFERs. The ABR also, or in the alternative, forwards the membership message to an ABR that connects the area to another area. This continues until the membership message reaches all overlay participants, or a particular overlay participant, in the BIER network. In the example above, ABR 910 forwards the membership message to ABR 908. ABR 908 performs a similar learning process, updates its GMT, updates the membership message, and transmits the membership message to the overlay participants in Area X, e.g., edge routers 906 and 916. In this way, the ABRs transmit membership messages between areas. Edge routers in all of the areas receive the membership messages and update their GMTs. Sources coupled to the edge routers transmit multicast data packets to the edge routers, and the edge routers act as BFIRs, which involves encapsulating the multicast data packets with a bit string that is used to forward the multicast data packets to those BFERs that have subscribed to the multicast group.

Figure 12:
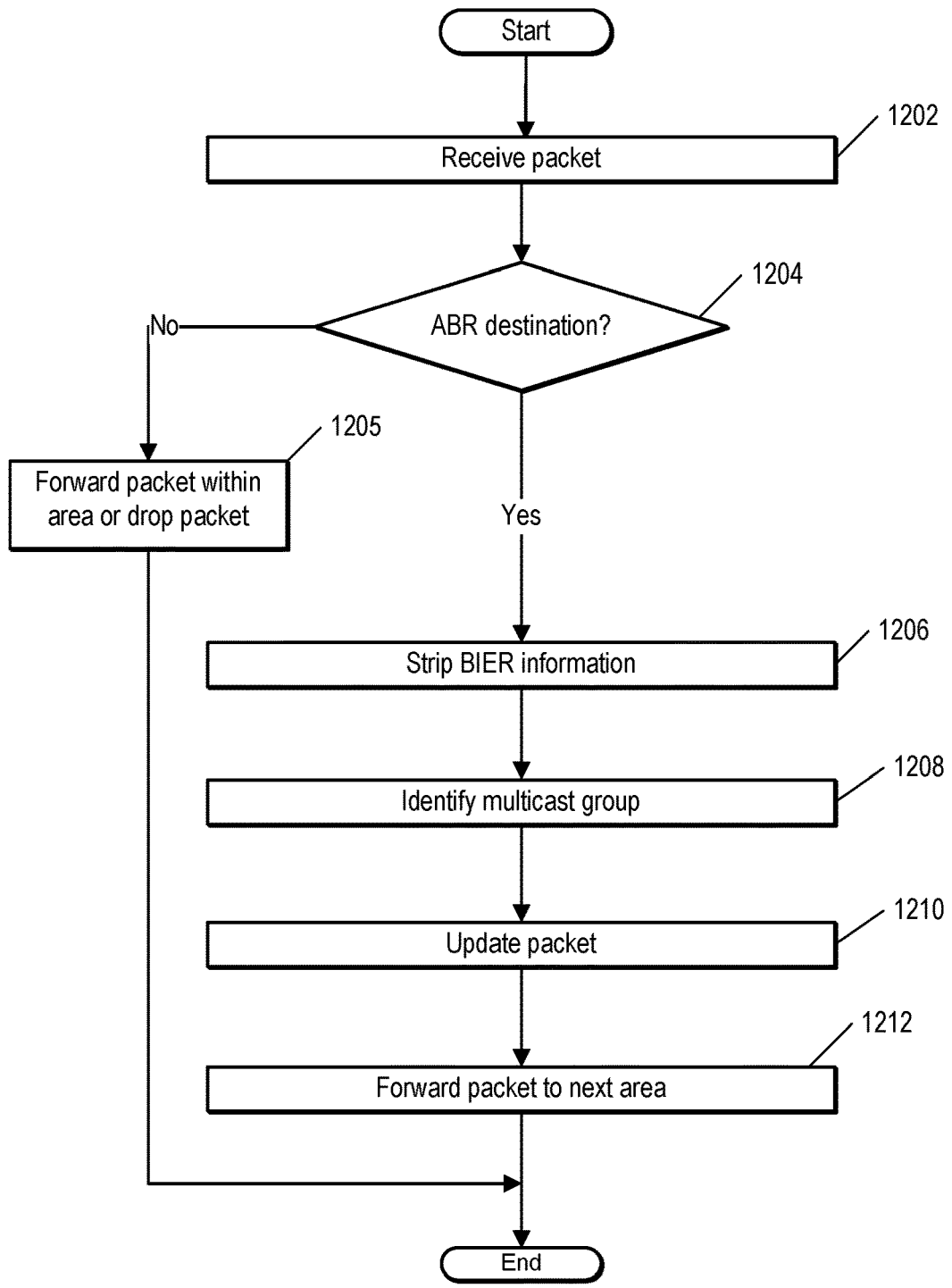
FIG. 12 is a flow chart illustrating an example process employed by a node, according to the present description.

FIG. 12 shows a method of forwarding a multicast data packet through multiple BIER areas. In one embodiment, the method is performed by an ABR, such as ABR 908 of FIG. 9. At 1202, the ABR receives a multicast data packet that includes BIER forwarding information, e.g., a bit string. In one embodiment, the multicast data packet is received from a BFIR, such as node 906 of FIG. 9.

At 1204, the ABR confirms that the ABR is a destination for the multicast data packet. In one embodiment, this involves checking to see whether a bit corresponding to a bit position assigned to the ABR is set in a bit string included in the multicast data packet. If the ABR's bit is not set in the bit string, the ABR is not a destination for the multicast data packet, meaning the ABR has not joined the multicast group on behalf of any BFERs in adjoining areas, such as Area X or Area Y. In response to determining that it is not the destination, the ABR is essentially a transit node for the Area and the ABR forwards the multicast data packet, at 1205, to any BFERs in the area that are coupled to the ABR. If the ABR is not coupled to any other BFERs whose BPs are set in the bit string, and the ABR is not a destination, the ABR drops the multicast data packet.

In response to determining at 1204 that the ABR is a destination for the multicast data packet, the ABR strips, at 1206, the BIER information from the multicast data packet. In one embodiment, this involves removing the bit string from the multicast data packet. At 1208, the ABR identifies a multicast group associated with the multicast data packet. In one embodiment, this comprises accessing a multicast group address included in the multicast data packet. The ABR performs a lookup into the ABR's group membership table using the multicast group from the multicast data packet. The ABR looks up the bit string associated with the multicast group. At 1210, the ABR updates the multicast data packet. In one embodiment, this comprises encapsulating the multicast data packet with a BIER header, including the bit string. At 1212, the ABR forwards the multicast data packet into the adjoining area. In one embodiment, this involves forwarding the multicast data packet using a BFT maintained by the ABR and forwarding the multicast data packet to one or more BFERs in the area as well as one or more ABRs in the area.

Figure 13:
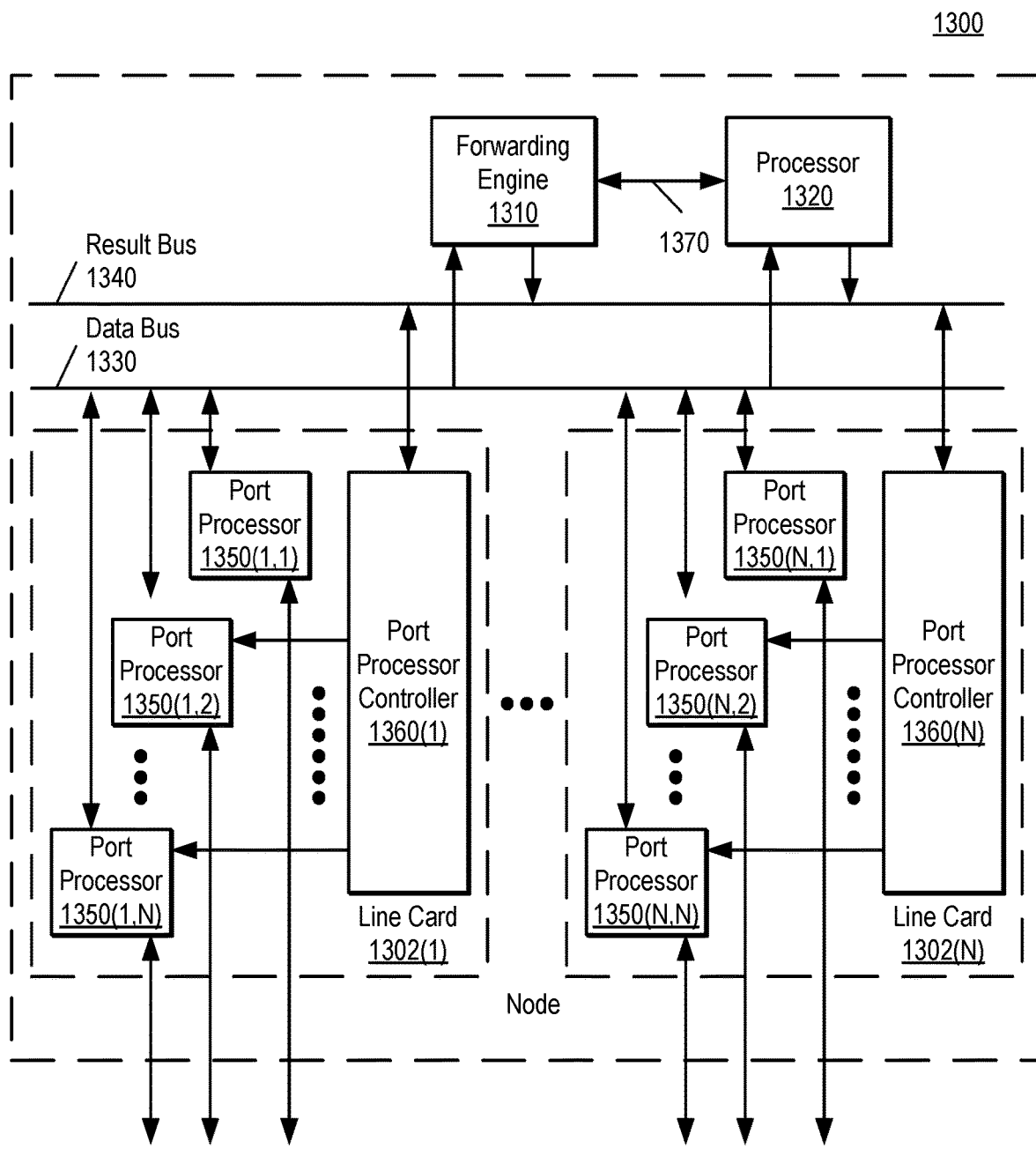
FIG. 13 is a block diagram illustrating certain components of an example node that can be employed, according to the present description.

FIG. 13 is a block diagram illustrating certain additional and/or alternative components of nodes that can be employed, for example in the network shown in FIG. 3. In this depiction, node 1300 includes a number of line cards (line cards 1302(1)-(N)) that are communicatively coupled to a forwarding engine or packet forwarder 1310 and a processor 1320 via a data bus 1330 and a result bus 1340. Line cards 1302(1)-(N) include a number of port processors 1350(1,1)-(N,N) which are controlled by port processor controllers 1360(1)-(N). It will also be noted that forwarding engine 1310 and processor 1320 are not only coupled to one another via data bus 1330 and result bus 1340, but are also communicatively coupled to one another by a communications link 1370.

The processors 1350 and 1360 of each line card 1302 may be mounted on a single printed circuit board. When a packet or packet and header are received, the packet or packet and header may be identified and analyzed by router 1300 in the following manner. Upon receipt, a packet (or some or all of its control information) or packet and header is sent from the one of port processors 1350(1,1)-(N,N) at which the packet or packet and header was received to one or more of those devices coupled to data bus 1330 (e.g., others of port processors 650(1,1)-(N,N), forwarding engine 1310 and/or processor 1320). Handling of the packet or packet and header can be determined, for example, by forwarding engine 1310. For example, forwarding engine 1310 may determine that the packet or packet and header should be forwarded to one or more of port processors 1350(1,1)-(N,N). This can be accomplished by indicating to corresponding one(s) of port processor controllers 1360(1)-(N) that the copy of the packet or packet and header held in the given one(s) of port processors 1350(1,1)-(N,N) should be forwarded to the appropriate one of port processors 1350(1,1)-(N,N). In addition, or alternatively, once a packet or packet and header has been identified for processing, forwarding engine 1310, processor 1320 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or the packet and header's information that has been thusly protected.

Figure 14:
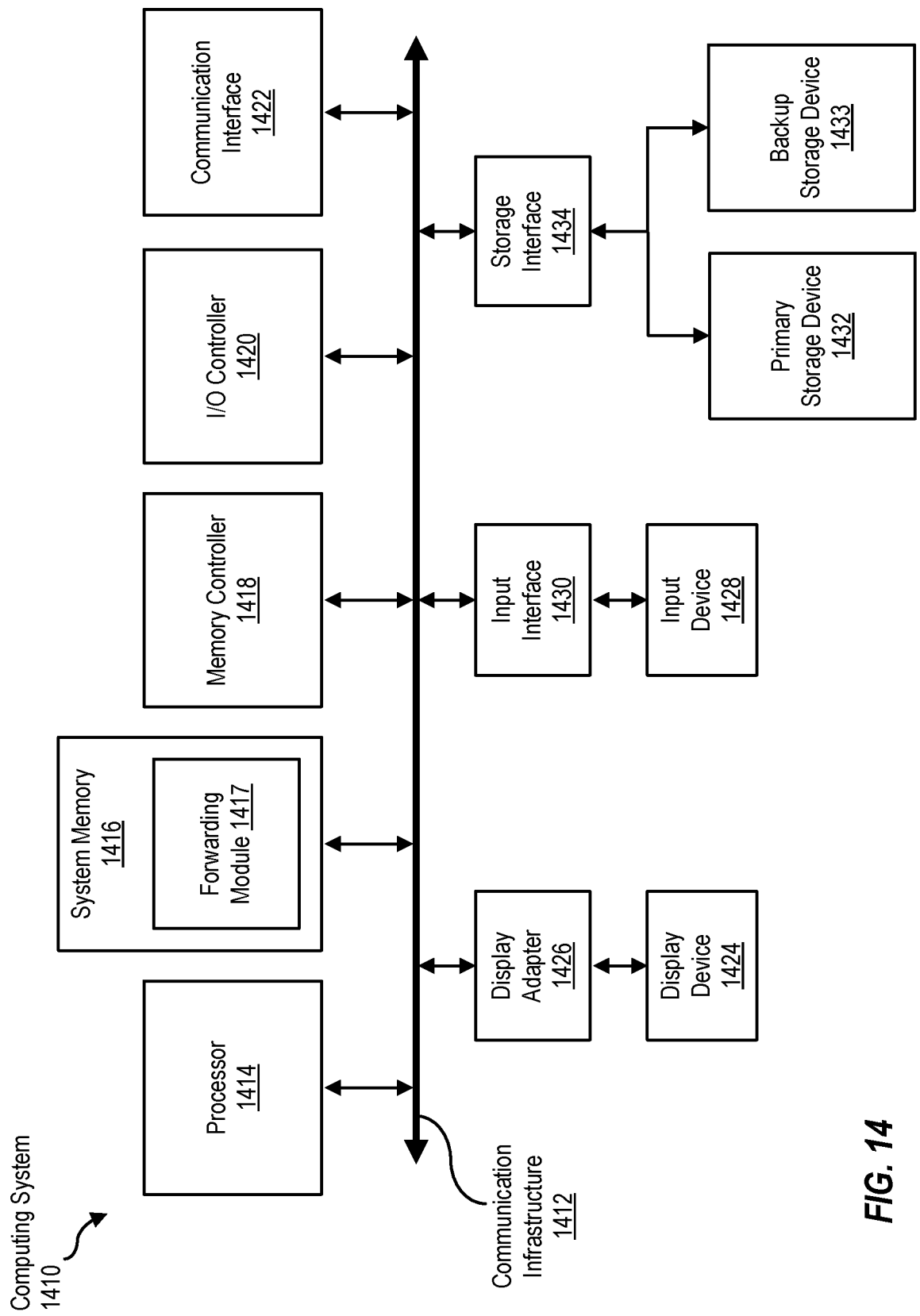
FIG. 14 is a block diagram depicting a computer system suitable for implementing embodiments of the systems described herein.

FIG. 14 is a block diagram of a computing device, illustrating how a forwarding module can be implemented in software, as described above. Computing system 1410 broadly represents any single or multi-processor computing device or system capable of executing computer-readable instructions. Examples of computing system 1410 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1410 may include at least one processor 1414 and a system memory 1416. By executing the software that implements a forwarding module 1417, computing system 1410 becomes a special purpose computing device that is configured to perform packet forwarding, in the manner described above.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the embodiments described and/or illustrated herein. For example, processor 1414 may perform and/or be a means for performing the operations described herein. Processor 1414 may also perform and/or be a means for performing any other operations, methods, or processes described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, program instructions executable to implement a forwarding module configured to forward multicast data packets may be loaded into system memory 1416.

In certain embodiments, computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an Industry Standard Architecture (ISA), Peripheral Component Interconnect (PCI), PCI express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412. In certain embodiments, memory controller 1418 may perform and/or be a means for performing, either alone or in combination with other elements, one or more of the operations or features described and/or illustrated herein.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer) for display on display device 1424.

As illustrated in FIG. 14, computing system 1410 may also include at least one input device 1428 coupled to communication infrastructure 1412 via an input interface 1430. Input device 1428 generally represents any type or form of input device capable of providing input, either computer or human generated, to computing system 1410. Examples of input device 1428 include, without limitation, a keyboard, a pointing device, a speech recognition device, or any other input device.

As illustrated in FIG. 14, computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410. A storage device like primary storage device 1432 can store information such as routing tables and forwarding tables.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14.

Computing system 1410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1410 for storage in memory via a network such as the Internet or upon a carrier medium.

The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1410 may be configured as an application specific integrated circuit (ASIC) adapted to implement one or more of the embodiments disclosed herein.

Figure 15:
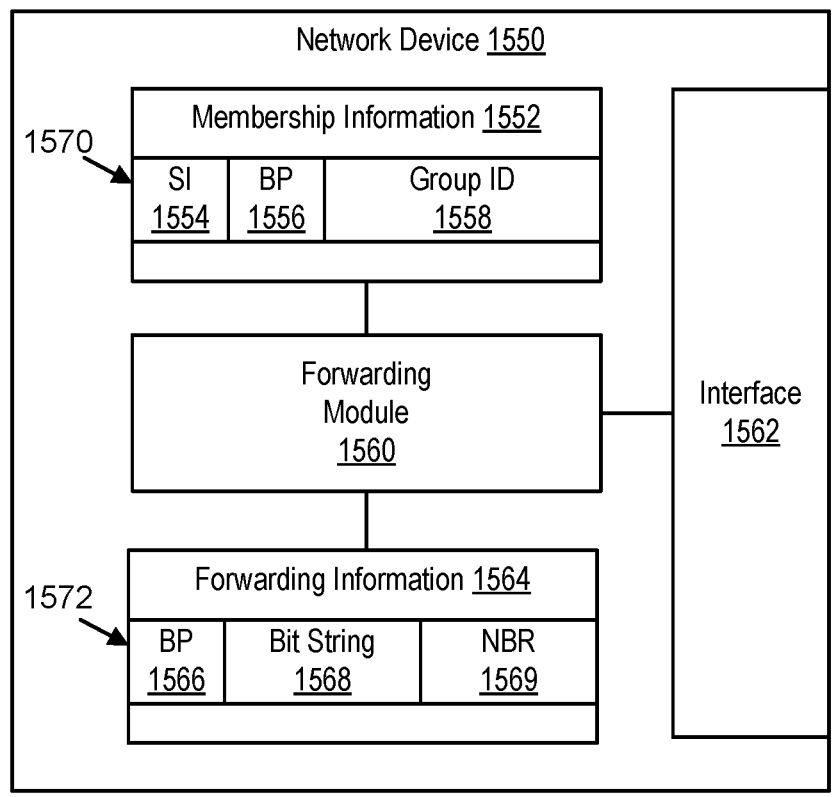
FIG. 15 is a block diagram depicting a network device suitable for implementing embodiments of the systems described herein.

A block diagram of an exemplary network device that may be associated with a node in network 200 of FIG. 2 is shown in FIG. 15. Network device 1550 of FIG. 15 may, for example, be associated with BIER-enabled node 206 in FIG. 2. In some cases "node" as used herein encompasses one or more network devices associated with the node. "Network devices" as used herein includes various devices, such as routers, switches, or network controllers that perform routing and/or forwarding functions and support one or more routing and/or switching protocols. A network device maintains one or more routing and/or forwarding tables that store routing and/or forwarding information identifying paths to various data sources and/or data consumers. In, for example, a multicast-enabled node, a network device implements a multicast routing protocol that is used to convey multicast data packets from a multicast source to a multicast receiver.

In the embodiment of FIG. 15, network device 1550 includes storage for membership information 1552, storage for forwarding information 1564, a forwarding module 1560, and an interface 1562. Interface 1562 is coupled to send and receive packets and/or other network messages. It is noted that network device 1550 may include additional interfaces, and that each interface can be a logical or physical interface. In one embodiment, interface 1562 includes one or more ports.

Forwarding module 1560 is configured to perform forwarding based on the stored forwarding information 1564. Forwarding module 1560 is also configured to update the stored membership information 1552 and forwarding information 1564. Forwarding module 1560 can implement one or more instances of a layer 3 protocol and/or a layer 2 protocol.

Entry 1570 provides an example of membership information stored in memory of a network device. As shown, entry 1570 includes a set identifier 1554, information 1556 identifying a bit position (BP), and information 1558 identifying a multicast group. The SI and BP identify a node with which entry 1570 is associated, and the multicast group information identifies a multicast group to which the corresponding node is subscribed. The storage for membership information 1552 is, in one embodiment, implemented as a group membership table.

Entry 1572 provides an example of forwarding information that can be stored in memory of a network device. As shown, entry 1572 includes information 1566 identifying a BP, a bit string or bit array 1568, and information 1569 identifying a neighbor. Forwarding module 1560 uses the information in entry 1572 to forward multicast data packets to the interface associated with the neighbor identified in the entry. The storage for forwarding information 1564 is, in one embodiment, implemented as a bit indexed forwarding table, or bit forwarding table (BFT).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a membership message, wherein
the membership message comprises
information identifying a multicast group, and
information identifying a plurality of egress routers,
the plurality of egress routers comprises a first egress router, and
the membership message was generated by the first egress router;
identifying at least one bit position in the membership message that is associated with the first egress router, wherein
identifying the at least one bit position comprises accessing the information identifying the plurality of egress routers,
the information identifying the plurality of egress routers comprises a bit string,
the bit string comprises a plurality of bits in a plurality of bit positions,
at least one bit position of the plurality of bit positions is associated with the first egress router; and
recording membership of the first egress router in the multicast group, wherein
the membership is recorded in a bit of a group membership table, and
the bit corresponds to the bit position identified in the membership message.

2. The method of claim 1, wherein
the membership message identifies a multicast group, and
the multicast group comprises a plurality of transit nodes and the plurality of egress routers.

3. The method of claim 2, further comprising:
parsing the membership message to identify the multicast group, wherein
the parsing comprises
identifying a multicast group address field, and
extracting a multicast group address from the multicast group address field.

4. The method of claim 2, wherein
each bit position of the plurality of bit positions represents at least one of the plurality of egress routers without representing any of the plurality of transit nodes.

5. The method of claim 1, wherein
the membership message was received by an overlay participant node.

6. The method of claim 5, further comprising:
determining whether group membership information for the multicast group is already stored by the overlay participant node, wherein
the determining comprises querying the group membership table.

7. The method of claim 1, wherein:
the bit string comprises a first subset of bits and a second subset of bits, wherein
the first subset of bits indicates a set to which the egress router belongs, and
the second subset of bits comprises the information identifying the plurality of egress routers.

8. The method of claim 1, wherein:
at least one of the bit positions that represents the egress router was assigned based on an order in which the egress router joined the multicast group.

9. A network device comprising:
a memory storing instructions;
a network interface configured to receive a membership request from a host; and
a processor configured to execute the instructions to perform a method comprising:
receiving a membership message, wherein
the membership message comprises
information identifying a multicast group, and
information identifying a plurality of egress routers,
the plurality of egress routers comprises a first egress router, and
the membership message was generated by the first egress router;
identifying at least one bit position in the membership message that is associated with the first egress router, wherein
identifying at least one bit position comprises accessing the information identifying the plurality of egress routers,
the information identifying the plurality of egress routers comprises a bit string,
the bit string comprises a plurality of bits in a plurality of bit positions, at least one bit position of the plurality of bit positions is associated with the first egress router; and recording membership of the first egress router in the multicast group, wherein the membership is recorded in a bit of a group membership table, and the bit corresponds to the bit position identified in the membership message.

10. The network device of claim 9, wherein
the membership message identifies a multicast group, and
the multicast group comprises a plurality of transit nodes and the plurality of egress routers.

11. The network device of claim 10, wherein the method further comprises:

parsing the membership message to identify the multicast group, wherein
the parsing comprises
identifying a multicast group address field, and
extracting a multicast group address from the multicast group address field.

12. The network device of claim 10, wherein
each bit position of the plurality of bit positions represents at least one of the plurality of egress routers without representing any of the plurality of transit nodes.

13. The network device of claim 9, wherein
the membership message was received by an overlay participant node, and
at least one of the bit positions that represents the egress router was assigned based on an order in which the egress router joined the multicast group.

14. The network device of claim 13, wherein the method further comprises:

determining whether group membership information for the multicast group is already stored by the overlay participant node, wherein
the determining comprises querying the group membership table.

15. The network device of claim 9, wherein:
the bit string comprises a first subset of bits and a second subset of bits, wherein
the first subset of bits indicates a set to which the egress router belongs, and
the second subset of bits comprises the information identifying the plurality of egress routers.

16. A computer program product, comprising a plurality of instructions stored on a non-transient computer-readable storage medium, wherein the instructions are configured to execute a method comprising the steps of:

receiving a membership message, wherein
the membership message comprises
information identifying a multicast group, and
information identifying a plurality of egress routers,
the plurality of egress routers comprises a first egress router, and the membership message was generated by the first egress router;

identifying at least one bit position in the membership message that is associated with the first egress router, wherein
identifying at least one bit position comprises accessing the information identifying the plurality of egress routers,
the information identifying the plurality of egress routers comprises a bit string,
the bit string comprises a plurality of bits in a plurality of bit positions,
at least one bit position of the plurality of bit positions is associated with the first egress router; and recording membership of the first egress router in the multicast group, wherein
the membership is recorded in a bit of a group membership table, and
the bit corresponds to the bit position identified in the membership message.

17. The computer program product of claim 16, wherein
the membership message identifies a multicast group,
the multicast group comprises a plurality of transit nodes and the plurality of egress routers, and
each bit position of the plurality of bit positions represents at least one of the plurality of egress routers without representing any of the plurality of transit nodes.

18. The computer program product of claim 17, wherein the method further comprises:

parsing the membership message to identify the multicast group, wherein
the parsing comprises
identifying a multicast group address field, and
extracting a multicast group address from the multicast group address field.

19. The computer program product of claim 16, wherein
the membership message was received by an overlay participant node,
at least one of the bit positions that represents the egress router was assigned based on an order in which the egress router joined the multicast group,
the bit string comprises a first subset of bits and a second subset of bits, wherein
the first subset of bits indicates a set to which the egress router belongs, and
the second subset of bits comprises the information identifying the plurality of egress routers.

20. The computer program product of claim 19, wherein the method further comprises:

determining whether group membership information for the multicast group is already stored by the overlay participant node, wherein
the determining comprises querying the group membership table.

* * * * *